United States Patent [19]
Buie

[11] Patent Number: 5,725,231
[45] Date of Patent: Mar. 10, 1998

[54] TRAILER HITCH

[76] Inventor: Malcolm D. Buie, 1620 Lobdell Ave., Baton Rouge, La. 70806-8246

[21] Appl. No.: 560,657

[22] Filed: Nov. 20, 1995

[51] Int. Cl.⁶ ........................................ B60D 1/14
[52] U.S. Cl. ............... 280/455.1; 280/474; 280/499; 280/478.1; 280/484
[58] Field of Search ............... 280/446.1, 455.1, 280/474, 495, 498, 499, 477, 478.1, 479.2, 483, 484, 489, 447, 462

[56] References Cited

U.S. PATENT DOCUMENTS

| | | | |
|---|---|---|---|
| 2,531,289 | 11/1950 | Murat | 280/484 |
| 2,879,079 | 3/1959 | Edwards | 280/474 |
| 2,890,896 | 6/1959 | Hendrickson | 280/499 X |
| 3,556,558 | 1/1971 | McKee | 280/406 |
| 3,677,565 | 7/1972 | Slosiarek | 280/474 X |
| 3,756,618 | 9/1973 | Lewis | 280/489 |
| 3,871,686 | 3/1975 | Rendessy | 280/446 B |
| 4,147,372 | 4/1979 | Sumpter | 280/433 |
| 4,420,169 | 12/1983 | Taylor | 280/446.1 |
| 4,811,965 | 3/1989 | Eubanks | 280/455 |
| 5,306,037 | 4/1994 | Robertson | 280/495 |

OTHER PUBLICATIONS

"Pullrite" Pulliam Enterprises, Inc., 13790 East Jefferson Boulevard, Mishawaka, Indiana 46545; 219/259-1520.

*Primary Examiner*—Kevin Hurley
*Attorney, Agent, or Firm*—David L. Ray

[57] ABSTRACT

In accordance with the present invention there is provided a trailer hitch for quickly and easily connecting a trailer to a tractor including a draw bar, a primary pivot device for connecting the draw bar to the tractor, a hitching device connected to the trailer for connecting the trailer to the draw bar, the hitching device having a stabilizer and air cylinder connected thereto for decreasing the downward forces on the rear end of a tractor.

12 Claims, 7 Drawing Sheets

TRAILER HITCH

BACKGROUND OF THE INVENTION

1. Field of the Invention

The invention relates to trailer hitches. In particular, the invention relates to trailer hitches having pivoting draw bars.

2. Description of the Related Art

It is known in the art that trailers such as R.V. trailers attached to towing vehicles having a trailer hitch connected to the rear end of the towing vehicle tend to sway and oscillate from side-to-side and up-and-down when being towed on a highway, especially at the legal speed limits encountered on highways throughout the United States. Swaying and oscillation of the trailer and towing vehicle is particularly severe when a large vehicle such as a large truck or a large tractor-trailer passes the trailer and towing vehicle at high speeds common on most highways, and when gusts of wind are encountered.

Most of the swaying and oscillation of a trailer can be eliminated by replacing a hitch mounted on the rear end of a towing vehicle such as an automobile, van, or truck with a hitch connected to the rear end of a pivoting drawbar having a pivot point adjacent to the rear axle of the towing vehicle. Such a hitch is disclosed in U.S. Pat. No. 3,556,558, which is hereby incorporated by reference. Additional problems associated with conventional trailer hitches are recited in U.S. Pat. No. 3,556,558.

Exemplary of additional patents of the related art are the following U.S. Pat. Nos. 5,306,037; 4,811,965; 3,871,686; and 4,147,372.

The towing vehicle shall be referred to hereinafter as "tractor", and the word "tractor" shall include automobiles, vans, and trucks.

Another problem associated with tractors and trailers is the difficulty encountered in connecting the trailer to the tractor. Sway bars and\or load equalizer bars commonly used on conventional trailers must be connected between the tractor and the trailer and forcefully bent, or pre-loaded, to equalize loading and reduce swaying and oscillation of the trailer relative to the tractor. Connection of sway bars, equalizer bars, and trailers to trailer hitches commonly requires physical strength not easily summoned by elderly trailer owners, and injuries may occur when connection is attempted. In particular, connecting equalizer bars with a chain binder is dangerous because the chain binder may slip and hit the person using the binder.

SUMMARY OF THE INVENTION

In accordance with the present invention there is provided a trailer hitch for quickly and easily connecting a trailer to a tractor including a draw bar, a primary pivot device for connecting the draw bar to the tractor, a hitching device connected to the trailer for connecting the trailer to the draw bar, the hitching device having a stabilizer and air cylinder connected thereto for decreasing the downward forces on the rear end of a tractor.

The trailer hitch of the invention has the advantage of preventing swaying and oscillation of a trailer about a tractor.

The trailer hitch of the invention has the additional advantage of quickly and easily connecting a trailer to a tractor.

A further advantage of the trailer hitch of the invention is that essentially no physical force is necessary to completely connect the trailer and the tractor.

An additional advantage of the trailer hitch of the invention is that it may be used to pull a conventional small trailer such as a boat trailer or utility trailer.

DESCRIPTION OF THE PREFERRED EMBODIMENTS

Figures 1, 1A:
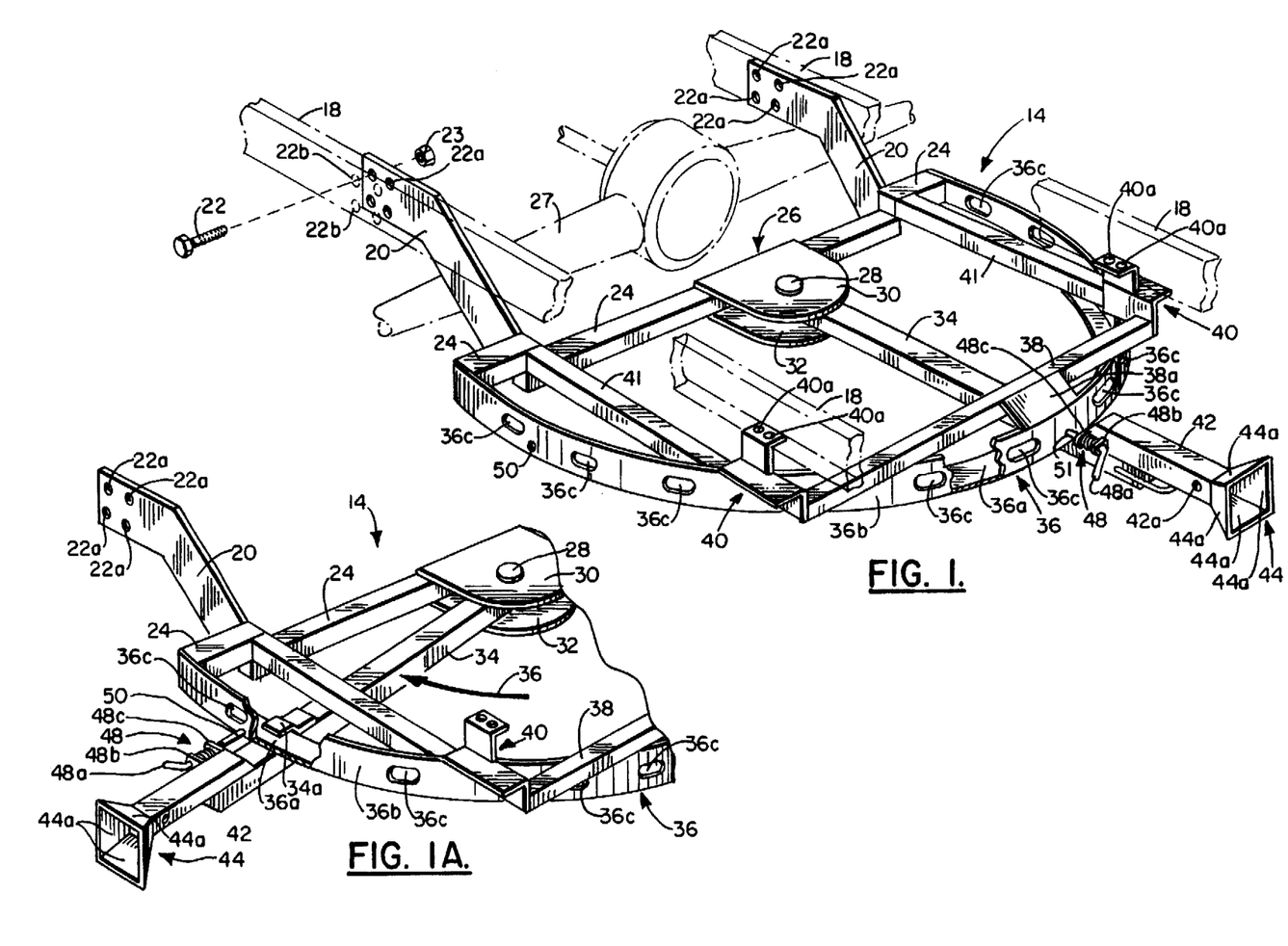
FIG. 1 is a perspective view of the tractor portion of the trailer hitch of the invention and a part of the tractor on which is the trailer hitch is placed shown in phantom lines.
FIG. 1A is a partly cut-away, perspective view of the tractor portion of the trailer hitch of the invention.
Figure 13:
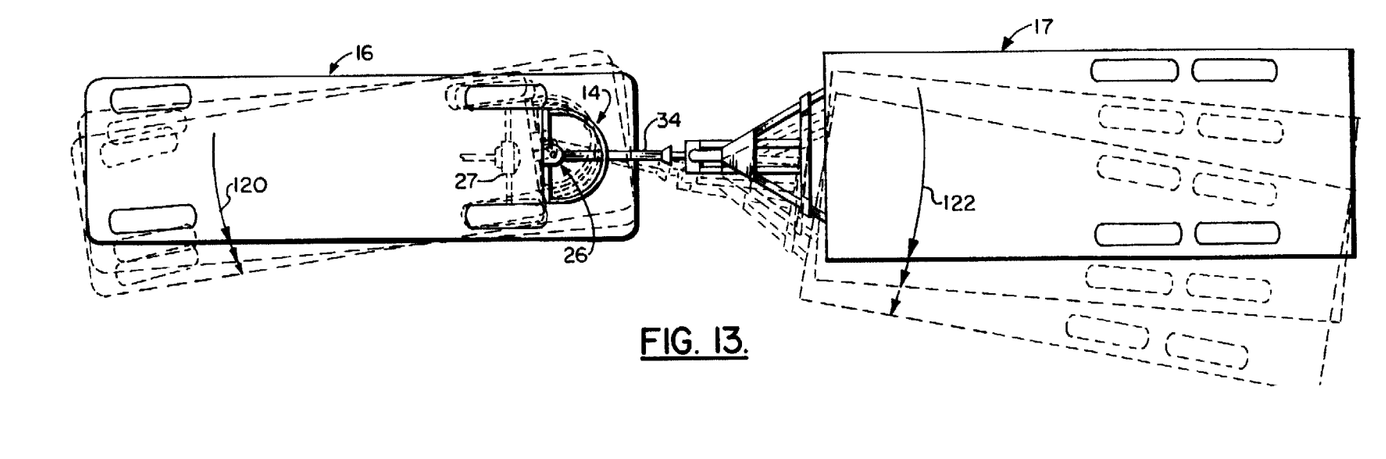
FIG. 13 is a schematic, top plan view of a tractor having the trailer hitch of the invention mounted thereon with a trailer connected thereto which illustrates the movement of the trailer when the tractor is making a left turn.

Referring now to the drawings, in FIG. 1 is shown the tractor portion, generally indicated by the numeral 14, of the trailer hitch of the invention which is connected to the tractor generally indicated by the numeral 16 pulling the trailer generally indicated by the numeral 17 in FIG. 13. The tractor portion 14 is connected to the two tractor frame members 18—18 by plates 20—20. Plates 20—20 may is connected to frame members 18—18 by bolting with a plurality of bolts 22 and nuts 23. Bolts 22 are received in bolt holes 22a in plates 20—20 and in bolt holes 22b which are drilled in frame members 18—18. If desired, plates 20—20 could be welded to frame members 18—18.

Cross-member 24 is rigidly connected to plates 20—20. Located in the center of cross-member 24 is the pivot point

3 generally indicated by the numeral 26. Pivot point 26 is located as close to tractor axle 27 as possible because the rear axle of a tractor such as tractor 12 is the location of the axis about which a conventional automobile or tractor turns as disclosed in U.S. Pat. No. 3,556,558, which has been incorporated by reference.

Pivot point 26 includes a pin 28 connected to two flanges 30 and 32 which are rigidly connected to the top and bottom of cross-member 24 by welding or the like. Pivot pin 28 extends through the front end of draw bar 34 which has an eye 34a shown in FIG. 7 identical to eye shown at the end of the drawbar in U.S. Pat. No. 3,556,558, which has been incorporated by reference. Pivot pin 28 is secured to flange 32 by nut 28a.

The draw bar 34 pivots about pivot pin 28 in a horizontal plane as indicated by the arrow 36 in FIG. 1A. The rear end of draw bar 34 is supported in a horizontal plane by the arcuate support generally indicated by the numeral 36. Arcuate support 36 is preferably L-shaped in cross section to provide an inner horizontal bearing surface 36a having a perpendicular arcuate wall 36b extending vertically upward therefrom. Inner horizontal support bearing surface 36a receives eye 34a to support draw bar 34 and prevents draw bar 34 from immediately falling from arcuate support member 36 if pivot pin 28 should break. Wall 36b preferably has a plurality of oblong holes 36c therein to reduce the weight thereof.

A second cross member 38 is rigidly connected to the top of wall 36b by welding or the like as shown in FIGS. 1 and 1A. Preferably, an additional plate 38a may be rigidly connected by welding or the like to the center of cross member 38 and to the top of wall 36b to provide additional strength and support for arcuate support 36 in the center thereof where the rear end of draw bar 34 is located when the tractor 12 is towing trailer 17 down a straight highway. Rigidly connected to each end of cross member 38 is flange assembly 40—40 which is also rigidly connected to frame members 18—18. Preferably, each flange assembly 40—40 is connected to frame members 18—18 by bolting through bolt holes 40a—40a, although flange assemblies 40—40 may be welded to frame members 18—18 if desired. Each flange assembly 40—40 is rigidly connected to cross member 24 by members 41—41 which extend from cross member 24 at right angles. Cross members 24, 38, and members 41—41 are preferably made from steel tubing having a square cross section, and are preferably connected together by welding.

Figure 7:
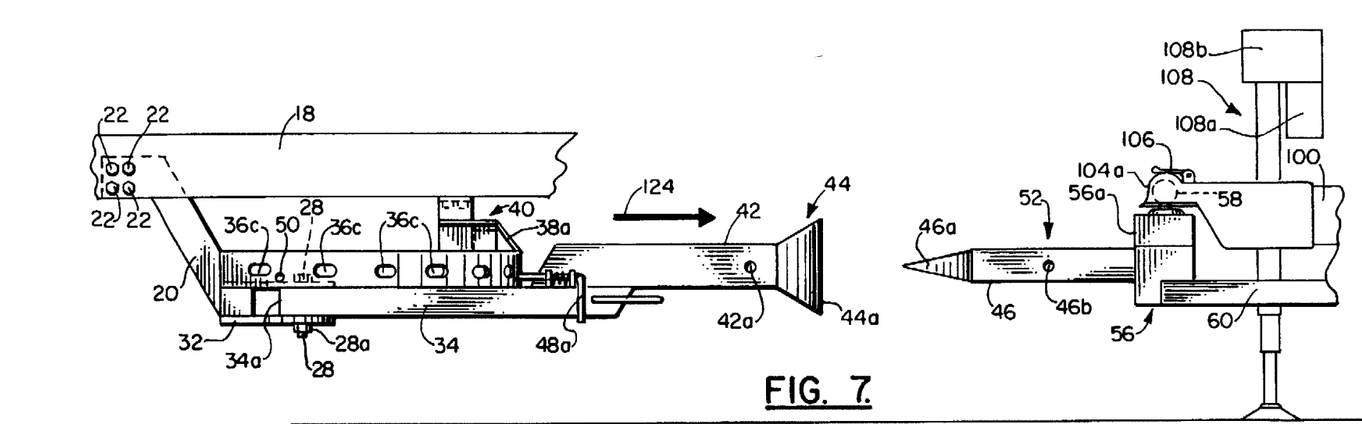
FIG. 7 is a partly cut-away, side elevational view of the tractor portion of the invention aligned for connection to the trailer portion of the invention, the trailer portion of the invention being supported by a jack.
Figure 8:
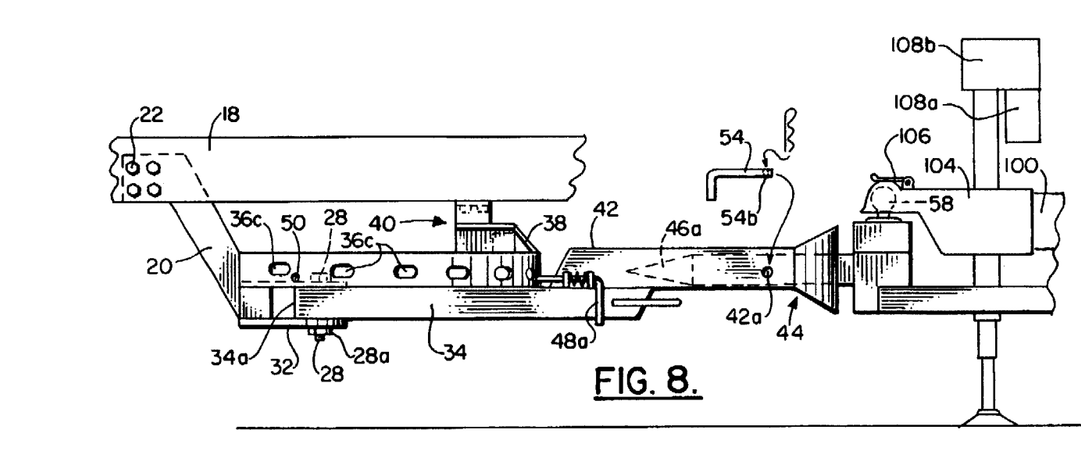
FIG. 8 is a partly cut-away, side elevational view of the tractor portion of the invention connected to the trailer portion of the invention, the trailer portion of the invention being supported by a jack.

As can best be seen in FIG. 1A, draw bar 34 has a lip 34a rigidly connected thereto by welding, bolting, or the like on the top side thereof which fits over bearing surface 36a to support the rear end of draw bar 34 as it pivots about arcuate support 36. Draw bar 34 also has a hollow box-section receiver 42 connected to the top thereof to the rear of wall 36b. Receiver 42 has an enlarged funnel generally indicated by the numeral 44 on the rear end thereof having tapered rectangular walls 44a to guide hitch tongue 46 shown in FIG. 2 into receiver 42 as shown in FIGS. 7 and 8, a hole 42a therein for receipt of a pin.

Rigidly connected to one side of receiver 42 is the pin assembly generally indicated by the numeral 48. Pin assembly 48 includes an L-shaped pin 48a slidably received in two brackets 48b and 48c which are welded to receiver 42. Pin 48a is slidably received in hole 50 in wall 36b when no trailer 17 is being towed by tractor 16 to prevent draw bar 34 from swinging from side to side when tractor 16 turns. Pin 48a is moved rearward and locked against bracket 48c when trailer 17 is being towed by tractor 16. Pin 48a can be locked in hole 51 as shown in FIG. 1, if desired. A small trailer such as boat trailer or utility trailer could then be puller with drawbar 34.

Figure 2:
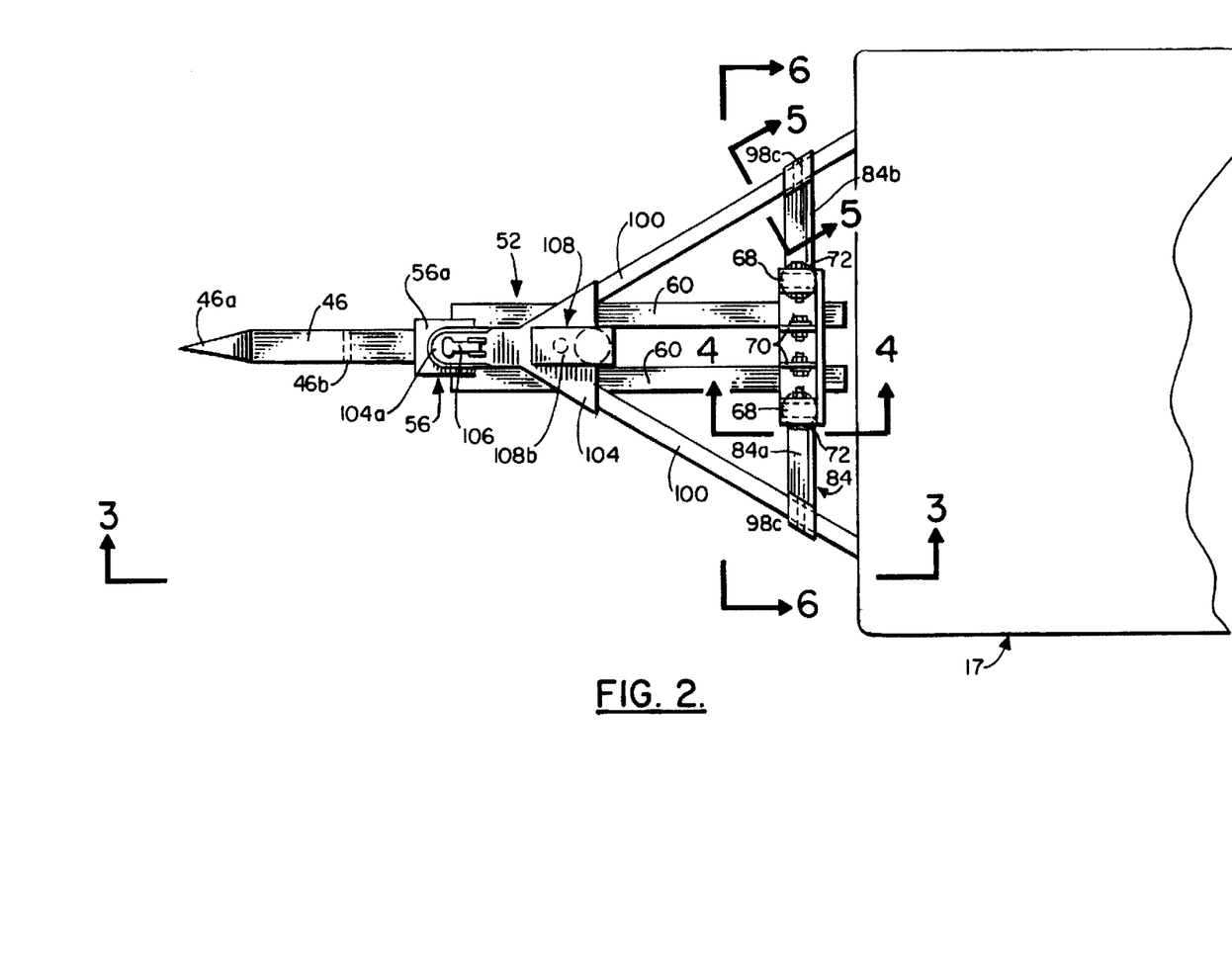
FIG. 2 is a partly cut-away, top plan view of the trailer portion of trailer hitch of the invention.
Figure 3:
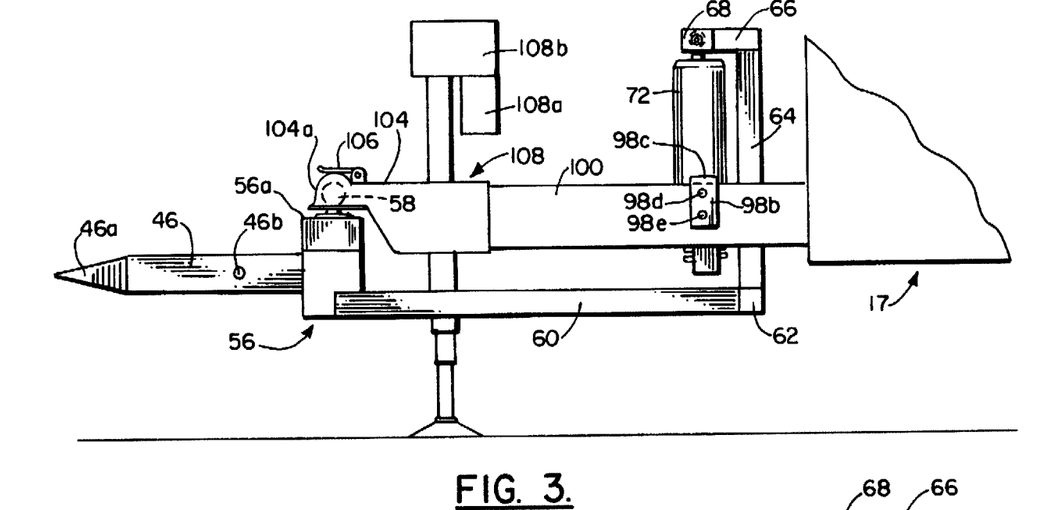
FIG. 3 is a partly cut-away, side elevational view of the trailer portion of the trailer hitch of the invention supported by a jack.

In FIG. 2 is shown the trailer portion, generally indicated by the numeral 52, of the trailer hitch of the invention which is connected to the trailer 17 shown in FIG. 13. Trailer portion 52 includes hitch tongue 46. Hitch tongue 46 has a pointed end 46a which enables receiver 42 as shown in FIGS. 7 and 8 to be easily guided over hitch tongue 46. Hitch tongue 46 has a pin hole 46b therein for receipt of pin 54 shown in FIG. 8.

Hitch tongue 46 is rigidly connected to the hitch block generally indicated by the numeral 56 by welding or the like. Hitch block 56 has a conventional hitch ball 58 threaded into the top 56a thereof. Rigidly connected to each side of hitch block 56 are stabilizer bars 60—60 by welding or the like. Stabilizer bars 60—60 are shown to have a square cross section, although stabilizer bars with round, elliptical, or any other desired cross section may be used. Stabilizer bars 60—60 may be sized to achieve the desired stabilizing effect.

Figure 4:
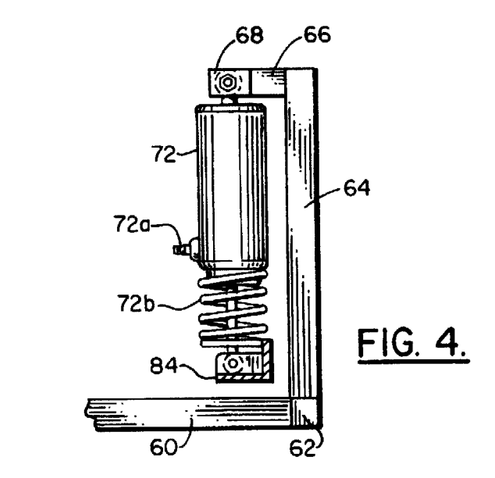
FIG. 4 is a partly cut-away, side elevational view taken along lines 4—4 of FIG. 2.
Figure 5:
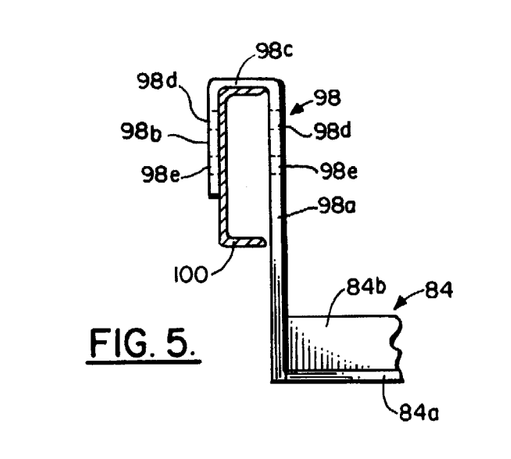
FIG. 5 is a partly cut-away, side elevational view taken along lines 5—5 of FIG. 2.
Figure 11:
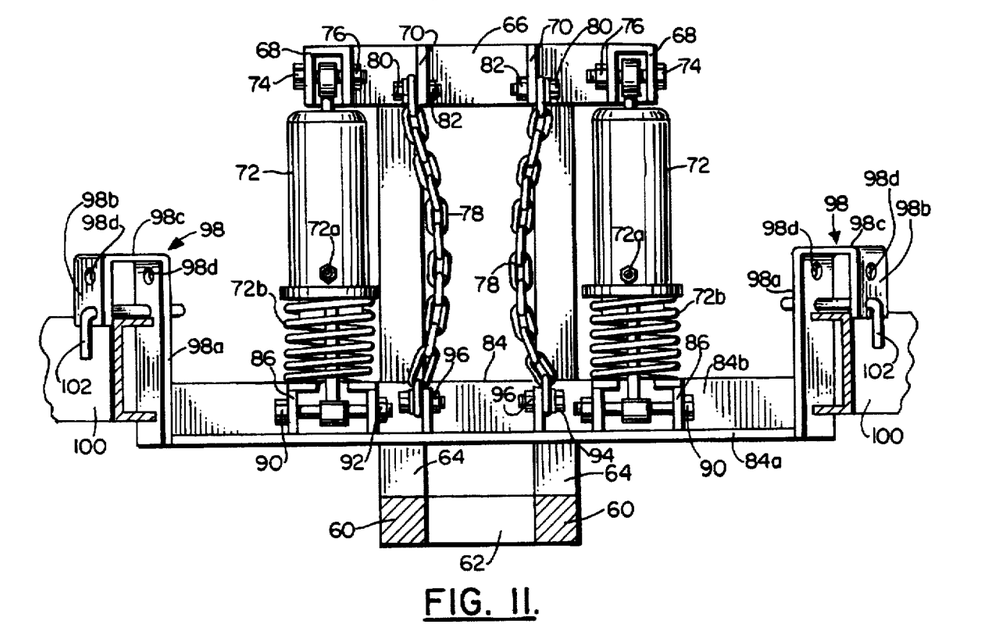
FIG. 11 is a partly cut-away, side elevational view taken along lines 6—6 of FIG. 2 while the trailer is in the vertical position shown in FIG. 10.

Rigidly connected to the rear ends of stabilizer bars 60—60 by welding or the like is lower cross member 62 as shown in FIG. 11. Extending vertically upward from lower cross member 62 and in alignment with stabilizer bars 60—60 are air cylinder supports 64—64 as shown in FIGS. 4 and 11. Air cylinder supports 64—64 have an upper cross member 66 rigidly connected to the upper end thereof which has U-shaped air cylinder support brackets 68—68 rigidly connected thereto and chain support flanges 70—70 rigidly connected thereto. Air cylinders 72—72 are connected at their upper ends to brackets 68—68 by bolts 74—74 and nuts 76—76. Chains 78—78 are connected at their upper ends to chain support flanges 70—70 by bolts 80—80 and nuts 82—82.

At the lower end of air cylinders 72—72 and chains 78—78 is L-shaped trailer lower cross member 84 having a horizontal leg 84a and a vertical leg 84b. Lower cross member 84 has U-shaped air cylinder connection brackets 86—86 rigidly connected to leg 84a and chain connection flanges 88—88 rigidly connected to leg 84a. Air cylinders 72—72 are connected at their lower ends to brackets 86—86 by bolts 90—90 and nuts 92—92. Chains 78—78 are connected at their lower ends to chain support flanges 88—88 by bolts 94—94 and nuts 96—96 and limit the downward movement of lower cross member 84. Air cylinders 72—72 have air valves 72a—72a for filling with air of any desired pressure to adjust the total length of the air cylinders 72—72. Air cylinders 72—72 also preferably have springs 72b—72b thereon to provide additional support to air pistons 72—72. Air cylinders 72—72 are conventional air shock absorbers which are known in the art.

Two U-shaped brackets generally indicated by the numeral 98 are rigidly connected to the each end of trailer lower cross member 84 by welding or the like. Brackets 98—98 have two vertical, parallel walls 98a and 98b connected at their top ends by horizontal top 98c. Brackets 98—98 receive trailer beams 100—100 therein and rest thereon. Each bracket 98 has two sets of pin holes 98d and 98e therein for receipt of pins 102—102. If desired, three or more sets of pin holes may be provided.

Trailer beams 100—100 are connected together at the front end thereof to front end piece 104 as shown in FIGS. 2 and 11. Front end piece 104 has a ball receiving socket 104a on the front end thereof for receipt of hitch ball 58. A conventional hitch ball lock 106 is preferably connected to front end piece 104.

Also connected to front end piece 104 is the jack generally indicated by the numeral 108. Preferably jack 108 is an electric jack driven by an electric motor 108a through a gear case 108b, although a manual jack may be used if desired.

Figure 12:
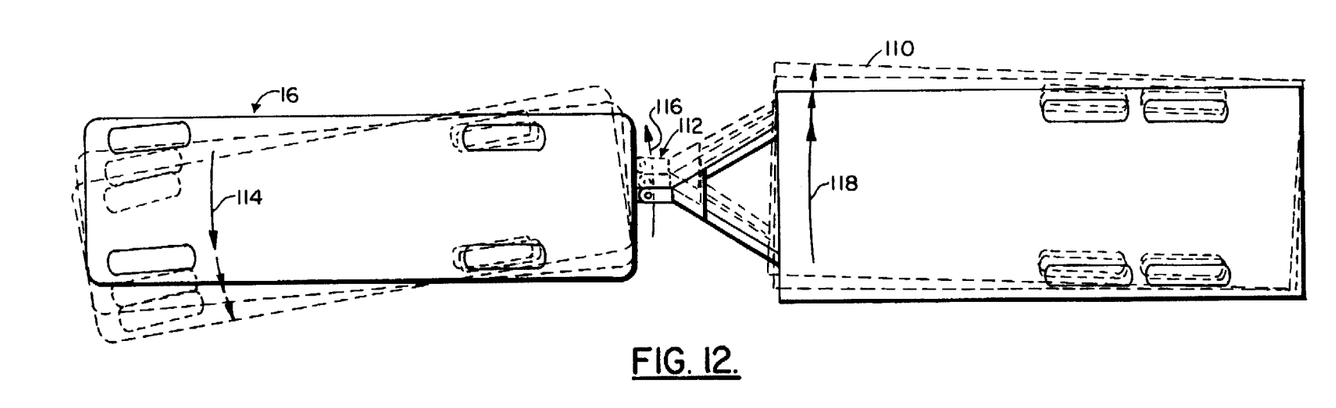
FIG. 12 is a schematic, top plan view of a tractor having a conventional trailer hitch mounted at the rear of the tractor with a trailer connected thereto which illustrates the movement of the trailer when the tractor is making a left turn.

To illustrate the forces involved in towing a trailer while the tractor is turning, in FIG. 12 is shown a tractor 16 connected to a trailer 17 having a conventional ball and socket hitch generally indicated by the numeral 112 connected to the rear end of tractor 16. As tractor 16 first turns left, as indicated by the arrow 114, the ball and socket hitch 112 at the rear of the tractor 16 turns in the opposite direction as indicated by the arrow 116, and trailer 110 turns in the direction indicated by the arrow 118. Trailer 110 must, as tractor 16 continues to turn, begin to turn in the opposite direction from arrow 116 and 118. Movement of trailer 110 in at least two different directions for each turn causes swaying and oscillation due to weight shifting as the springs on the vehicles react to the side-to-side created while turning.

In FIG. 13, the advantages of using a hitch having a pivoting draw bar with the pivot point closely adjacent to the rear axle is illustrated. As tractor 16 turns left as indicated by the arrow 120 in FIG. 13, draw bar 34 pivots about pivot point 26, which is located as close to rear axle 27 as possible, and trailer 17 turns in the direction indicated by the arrow 122, which is in the same direction as arrow 120. Thus, swaying and oscillation of trailer 17 is greatly reduced or eliminated, depending upon the distance of pivot point 26 from rear axle 27.

Figure 6:
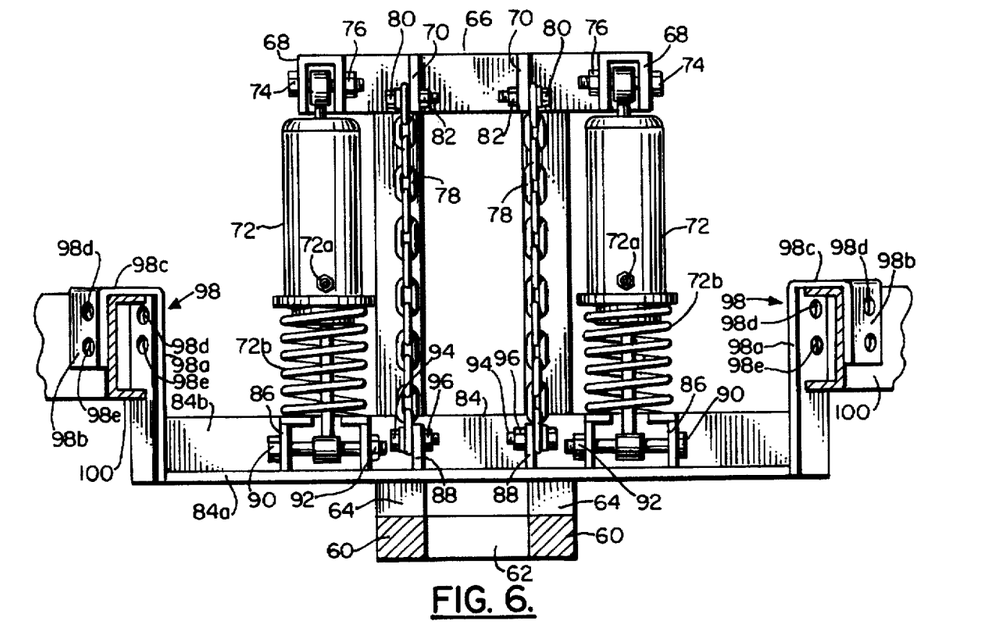
FIG. 6 is a partly cut-away, side elevational view taken along lines 6—6 of FIG. 2 while the trailer is in the vertical position shown in FIG. 3.

The connection of the tractor 16 to trailer 17 is shown in FIGS. 7-10. As can be seen in FIG. 7, funnel 44 and receiver 42 is aligned with hitch tongue 46 while trailer portion 52 is supported by jack 108, and tractor 16 is driven rearward in the direction indicated by the arrow 124, receiving hitch tongue 46 inside receiver 42. Rearward movement of tractor 16 ceases when hitch tongue pin hole 46b is aligned with receiver pin hole 42a in receiver 42 as shown in FIG. 8. Pin 54 in then inserted completely through aligned holes 42a and 46b and out the opposite side of receiver 42, and secured by placing conventional snap pin 54a in circular groove 54b in pin 54. When looking rearward along lines 6—6 of FIG. 2, the air cylinders 72—72, stabilizer bars 60—60, trailer lower cross member 84, and U-shaped brackets 98 would be in the position shown in FIG. 6 with brackets 98 resting on the top of trailer beams 100—100 when the trailer is disconnected from the tractor.

Figure 9:
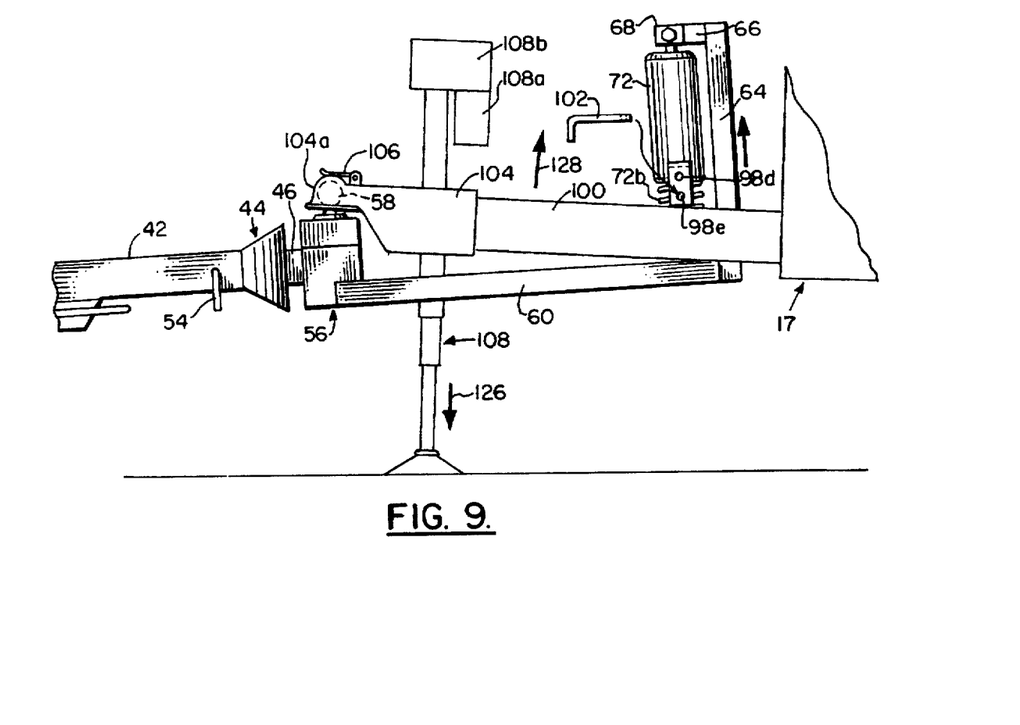
FIG. 9 is a partly cut-away, side elevational view of the tractor portion of the invention connected to the trailer portion of the invention, both of which have been raised from the position shown in FIG. 1 by extending the jack.
Figure 10:
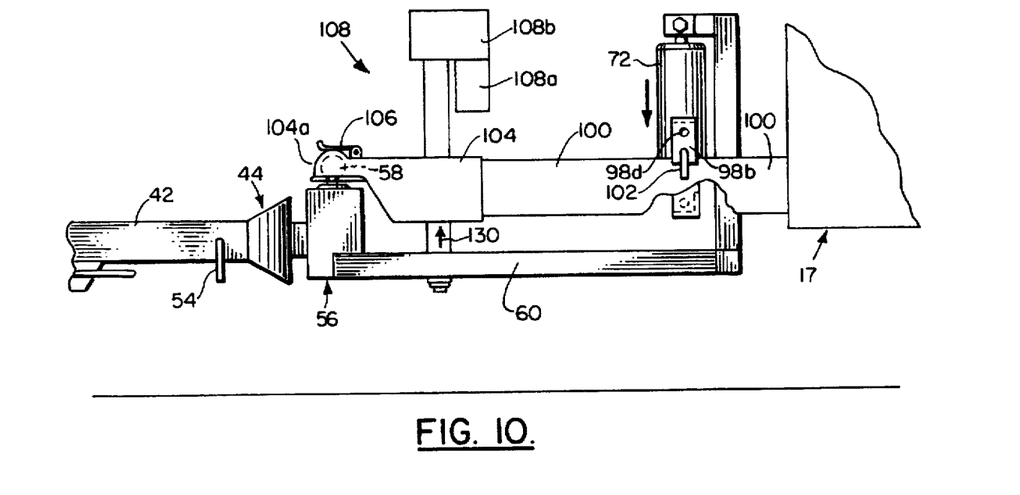
FIG. 10 is a partly cut-away, side elevational view of the tractor portion of the invention connected to the trailer portion of the invention.

As shown in FIG. 9, to load stabilizer bars 60—60 after connecting trailer 17 to drawbar 34, jack 108 is extended downward in the direction indicated by the arrow 126 thereby moving trailer beams 100—100, and trailer 17 upward as indicated by the arrow 128. Furthermore, air cylinders 72—72, stabilizer bars 60—60, trailer lower cross member 84, and U-shaped brackets 98 also move upwardly relative to trailer 17 can be seen in FIG. 9. After holes 98e—98e are raised above trailer beam 100, pin 102 is inserted into holes 98e—98e (or 98d—98d if desired), and jack 108 is retracted as indicated by the arrow 130 in FIG. 10. When looking rearward along lines 6—6 of FIG. 2, the air cylinders 72—72, stabilizer bars 60—60, trailer cross member 84, and U-shaped brackets 98—98 would be in the position shown in FIG. 11 with brackets pins 102 resting on the top of trailer beams 100—100. Stabilizer bars 60—60 decrease the downward forces that would be on the rear end of tractor 16 when jack 108 is retracted and pins 102 are placed in brackets 98.

The time required to connect the trailer 17 to the tractor 16 and load stabilizer bars 60—60 has been found to be approximately two minutes. When an electric jack 108 is employed, minimal physical force is required, thereby enabling persons having very little physical strength to connect and disconnect a trailer to a tractor utilizing the present invention without fatigue.

Although the preferred embodiments of the invention have been described in detail above, it should be understood that the invention is in no sense limited thereby, and its scope is to be determined by that of the following claims:

What is claimed is:

1. A trailer hitch stabilizer assembly connectable to a trailer having two beams rigidly connected to an end piece for receiving a ball hitch, said trailer hitch stabilizer assembly being adapted for quick and easy connection to a pivoting trailer hitch assembly connected to a tractor having a rear axle, said pivoting trailer hitch assembly having a pivoting draw bar having a front end and a rear end, the front end of said draw bar being pivotally connected to said tractor at a point closely adjacent to said rear axle of said tractor, the rear end of said draw bar being supported by an arcuate support member attached to said tractor and having a hollow receiver connected thereto, said trailer hitch assembly connectable to a trailer comprising:

a. a horizontal tongue for connection to said receiver, b. a hitch block rigidly connected to said tongue, said hitch block having a ball hitch connected thereto,     c. two generally horizontal elongated stabilizer bar means for selectively decreasing the downward forces on the rear end of said tractor when said trailer is connected to said tractor, each of said elongated stabilizer bar means having a front end and a rear end, said front end of each of said stabilizer bars being rigidly connected to said hitch block,     d. a rigid lower cross bar rigidly connected to each of said stabilizer bars at the rear end thereof,     e. a first vertical support bar connected perpendicularly upward from the rear end of one of said horizontal stabilizer bars, and a second vertical support bar connected perpendicularly upward from the rear end of the other of said horizontal stabilizer bars,     f. a rigid upper cross member connected to each of said support bars at the upper end thereof,     g. at least two air cylinders having an upper end and a lower end, said upper end of said air cylinders being connected to said rigid upper cross member,     h. an elongated air cylinder cross member connected to said lower ends of each of said air cylinders, said elongated cross member having two ends,     i. at least two chains, each of said two chains having an upper end and a lower end, the upper end of each of said chains being connected to said rigid upper cross member, said lower end of each of said chains being connected to said air cylinder cross member, and     j. two bracket means connected to each end of said elongated air cylinder cross member for placement over said two beams of said trailer.

2. The trailer hitch stabilizer assembly of claim 1 wherein each of said two bracket means are U-shaped for receipt of one of said trailer beams.

3. The trailer hitch stabilizer assembly of claim 2 wherein each of said two bracket means have holes therein for receipt of pin means.

4. The trailer hitch stabilizer assembly of claim 3 wherein a hollow receiver means rigidly connected to said rear end of said draw bar for receipt of said horizontal tongue.

5. The trailer hitch stabilizer assembly of claim 4 wherein said hollow receiver means rigidly connected to said rear end of said draw bar has a funnel at the rear end thereof for receipt of said horizontal tongue.

6. The trailer hitch stabilizer assembly of claim 5 wherein said horizontal tongue is tapered to enable said tongue to be easily fitted in said receiver.

7. The trailer hitch stabilizer assembly of claim 6 wherein a jack is connected to said trailer for lowering and raising said trailer.

8. The trailer hitch stabilizer assembly of claim 1 wherein each of said two bracket means have holes therein for receipt of pin means.

9. The trailer hitch stabilizer assembly of claim 1 wherein a hollow receiver means rigidly connected to said rear end of said draw bar for receipt of said horizontal tongue.

10. The trailer hitch stabilizer assembly of claim 9 wherein said hollow receiver means rigidly connected to said rear end of said draw bar has a funnel at the rear end thereof for receipt of said horizontal tongue.

11. The trailer hitch stabilizer assembly of claim 1 wherein said horizontal tongue is tapered to enable said tongue to be easily connected to said draw bar.

12. The trailer hitch stabilizer assembly of claim 1 wherein a jack is connected to said trailer for lowering and raising said trailer.

* * * * *